Figure 1:
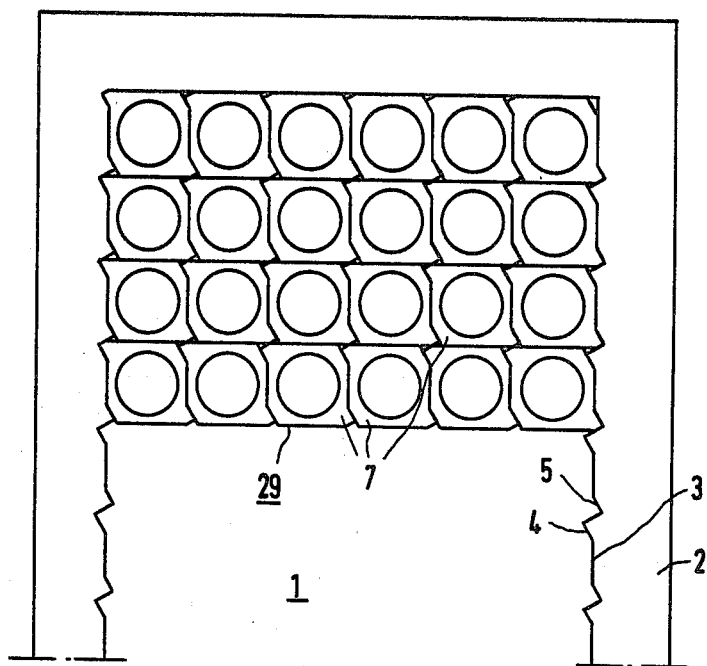

United States Patent [19]

Kratz et al.

[11] 4,414,475
[45] Nov. 8, 1983

[54] SHIELDING CONTAINER FOR STORING WEAK TO MEDIALLY ACTIVE WASTE

[75] Inventors: Gerhard Kratz, Rodgau; Erich Marr, Mörfelden-Walldorf, both of Fed. Rep. of Germany

[73] Assignee: Kraftwerk Union Aktiengesellschaft, Mülheim, Fed. Rep. of Germany

[21] Appl. No.: 309,069

[22] Filed: Oct. 6, 1981

[30] Foreign Application Priority Data

Oct. 13, 1980 [DE] Fed. Rep. of Germany ....... 3038592

[51] Int. Cl.³ .......................... G21F 5/00; G21C 19/40
[52] U.S. Cl. ............................. 250/506.1; 250/507.1; 250/517.1; 376/272
[58] Field of Search ............... 250/505.1, 506.1, 507.1, 250/515.1, 517.1, 522.1; 376/272

[56] References Cited

U.S. PATENT DOCUMENTS

| 4,029,968 | 6/1977 | Rubinstein et al. | 376/272 |
| 4,305,787 | 12/1981 | Rivacoba | 250/506.1 X |
| 4,319,960 | 3/1982 | Larson et al. | 250/506.1 X |

*Primary Examiner*—Alfred E. Smith
*Assistant Examiner*—Jack I. Berman
*Attorney, Agent, or Firm*—Herbert L. Lerner; Laurence A. Greenberg

[57] ABSTRACT

Shielding container assembly for storing weak to medially active waste in a storage barrel, including a shielding container having a substantially square cross section surrounding the storage barrel, the shielding container having two pairs of oppositely-disposed sections, one of the pairs having symmetrical projections formed thereon and the other of the pairs having chamfers formed thereon, the projections and chamfers effecting anchoring of the containers when stacked close to each other.

11 Claims, 5 Drawing Figures

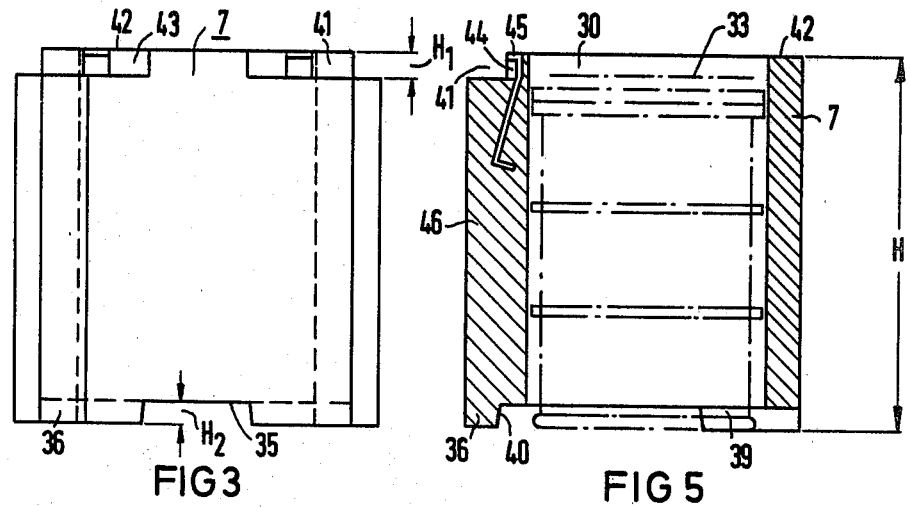
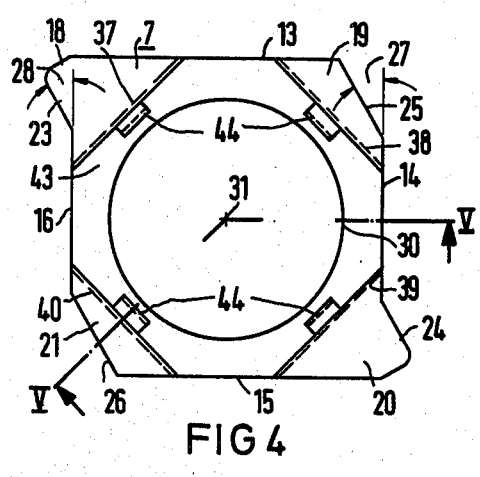

SHIELDING CONTAINER FOR STORING WEAK TO MEDIALLY ACTIVE WASTE

The invention relates to a shielding container for storing weak to medially active waste in a storage barrel or drum which is surrounded by the shielding container.

Shielding containers of this type, such as those shown in German Published, Non-Prosecuted Application DE-OS 27 16 463 and German Petty Patent DE-GM 77 36 411, have heretofore been provided for permanent connection with the storage barrel, because the shielding container which was made in the form of a concrete pot was closed after insertion of the storage barrel by a concrete plug which was cast on top. This means that the volume and weight of the prior art shielding containers had to be also considered during a later transport and especially during the final storage.

It is accordingly an object of the invention to provide a shielding container for storing weak to medially active wase, which overcomes the hereinafore-mentioned disadvantages of the heretofore known devices of this general type, and to obtain the shielding effect achieved by the known shielding containers only when required. The starting point is therefore the fact that the previously used final storage means are closed, so that the radioactive wastes must be in an intermediate storage facility, especially at the location where they are generated at least temporarily. However, in nuclear power plants only relatively little space is available for this purpose, so that it is necessary to effect the storage in the most compact form. On the other hand, it is not permissible to "plug-up" the available space for long periods of time, or permanently. Rather, only a temporary storage is intended, until final storage facilitates are available, similar to previously used disposal in the abandoned salt mine Asse.

With the foregoing and other objects in view there is provided, in accordance with the invention, a shielding container assembly for storing weak to medially active waste in a storage barrel, comprising a shielding container having a substantially or mainly square cross section surrounding the storage barrel, the shielding container having two pairs of oppositely-disposed sections or sides, one of the pairs having symmetrical projections formed thereon and the other of the pairs having chamfers formed thereon, and projections and chamfers effecting anchoring or interlocking of the containers when stacked close to each other.

With shielding containers of this type, it becomes possible to fill the storage rooms in a much better way than with the known concrete pots which have a cylindrical outer shape. This applies not only for the stacking itself, but also for the strength achieved thereby, which, for example, must be capable of withstanding the lateral forces created by a possible earthquake.

Furthermore, the shielding containers according to the invention can be used without a tight connection to the storage drums, because the required mechanical holding is provided by the new configuration of the cross section.

In accordance with another feature of the invention, the projections and chamfers are disposed at corners of the shielding container.

In accordance with a further feature of the invention, the projections and chamfers are in the form of symmetrical pairs.

In accordance with an added feature of the invention, the shielding container has a clearance space or opening therein for receiving the storage barrel, the space extending through the total height of the shielding container. They can be assembled to form a stack without the storage drums, and can be filled with the storage drums. This facilitates handling, because the transport-weights are much less.

In accordance with an additional feature of the invention, the clearance space has a cylindrical cross section and is centrally disposed in the substantially square cross section of the shielding container.

In accordance with again another feature of the invention, the shielding container has top and bottom surfaces thereon, the surfaces having raised portions formed thereon and having recesses formed therein into which the raised portions fit. This is done because it makes it possible to also stack the shielding containers in a formation having severakl layers high on top of each other.

In accordance with again a further feature of the invention, the raised portions are disposed at four corners of the square cross section of the shielding container.

In accordance with again an added feature of the invention, the shielding container has undercuts formed therein, optionally at the recesses for attachment of gripper tools.

In accordance with again an additional feature of the invention, there are provided reinforcements being disposed in the undercuts and extended into the shielding container, so that they are securely anchored there.

In accordance with a concomitant feature of the invention, there is provided a storage chamber having straight walls with recesses formed therein, the projections being extended into the recesses. In this way an anchoring with respect to the building itself is achieved. The stacked shielding containers are thereby well anchored against lateral forces, such as forces generated by an earthquake.

Other features which are considered as characteristic for the invention are set forth in the appended claims.

Although the invention is illustrated and described herein as embodied in a shielding container for storing weak to medially active waste, it is nevertheless not included to be limited to the details shown, since various modifications and structural changes may be made therein without departing from the spirit of the invention and within the scope and range of equivalents of the claims.

Figure 2:
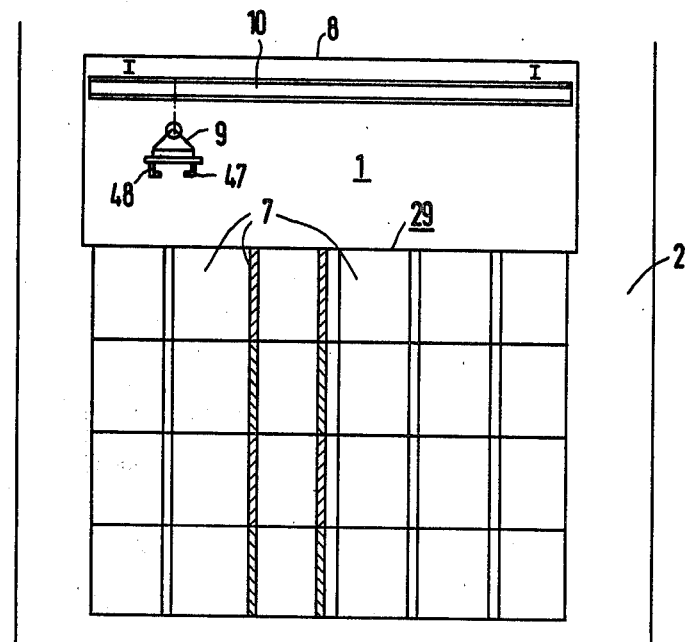

The construction and method of operation of the invention, however, together with additional objects and advantages thereof will be best understood from the following description of specific embodiments when read in connection with the accompanying drawings, in which:

FIGS. 1 and 2 are diagrammatic horizontal and vertical cross-sectional views, respectively, through a storage space according to the invention; and FIGS. 3, 4 and 5 are larger scale side and top plan views of an individual shielding container, as well as a vertical sectional view through the shielding container, respectively, FIG. 5 being taken along the line V—V in FIG. 4 in the direction of the arrows.

Referring now to the figures of the drawing and first particularly to FIGS. 1–3 thereof, it is seen that in a nuclear power plant, especially with a pressurized water reactor, provisions are made for at least temporary storage of the weak to medially active waste which results, for example, from the purification of the cooling medium, in a storage chamber 1 which is bounded by walls 2 in a protected building of the nuclear power plant. The walls 2 form a mostly even, flat inner surface 3. From the surface 3, projections 4 extend into the chamber 1, and recesses 5 are formed along side of the projections 4. Because of the uneven conditions formed by this configuration, shielding containers 7 which are densely stacked in the storage chamber 1 are secured in four layers on top of each other, as particularly shown in FIG. 2. The stacking extends, if possible, as far as the construction will allow up under the ceiling 8 of the chamber 1, where a hoist 9 is disposed so as to be movable on a rail 10.

The shielding containers 7 are formed of concrete or another readily available and inexpensively manufactured material with good shielding properties, such as cast iron. As especially clearly shown in FIG. 4, the containers have a mostly square cross section with flat side surfaces 13, 14, 15 and 16. Only the corners 18, 19, 20 and 21 deviate from this square cross section. In this way the diagonally opposed corners 18 and 20 are provided with projections 23 and 24, which extend beyond the square cross section, while the other corners 19 and 21 are flattened or chamfered so that the edge regions 25 and 26 form an angle 27 in FIG. 4, and thereby form recesses with respect to the square cross section.

The angle 27 matches an angle 28 of the projections 23 and 24, as shown at the corner 18. This causes the shielding containers 7 to interlock with each other and with the projections 4 and recesses 5 of the wall surface 3 due to the dense stacking as shown in FIGS. 1 and 2. The result is a solid stack 29 shown in FIG. 2, which, however, can still be taken apart in spite of its earthquake-resisting configuration, because it is based on an interlocking connection and not a permanently fixed connection.

The shielding containers 7 have a cylindrical clearance 30, having centers 31 that coincide with the centerpoint of the square cross section. In this cylindrical clearance, which extends through the total height H of the shielding container 7, as shown in FIG. 5, a storage barrel which is indicated at reference numeral 33 with dot-dash lines can be inserted. Thus, the barrel is mechanically well secured and shielded in the stack 29 of shielding containers 7, without having a fixed connection of its own with the shielding containers 7 or the walls 2. Therefore, the barrel 33 can be inserted after the shielding containers have been stacked, and it can also be removed again before breaking up the stack 29.

In order to reinforce the connection when stacking several layers on top of each other, projections 36 are provided at the bottom surface 35 of the shielding containers 7 at all four corners 18, 19, 20 and 21, in such a way that the side of the projections 36 facing the through-clearance 30 is formed by diagonally-oriented slopes 37, 38, 39 and 40. The top surface 42 on top of the shielding container 7 is provided with corresponding recesses 41, so that the middle region 43 between the corners 18 and 21 and the clearance 30 is raised. The height $H_1$ of the raised portions at the top surface 42 is the same as the height $H_2$ of the projections 36 at the bottom surface 35.

FIG. 5 shows that at the top surface 42, undercuts 44 are provided for attaching gripper-tools 47, 48 shown in FIG. 2, the undercuts being lined with an anchoring sheeting 45. The anchoring extends into the side-wall 46 of the shielding container. The anchoring 45 is formed of metal, so that the forces induced by the gripper tool into the concrete are well distributed into the concrete.

As shown in FIG. 4, in the illustrated embodiment there are four undercuts 44 symmetrically formed at the square cross section. However, for actual transport it may be sufficient if the hoist or lifting tool 9 is only attached to the shielding container 7 with two oppositely-disposed jaws 47 and 48.

We claim:

1. Shielding container assembly for storing weak to medially active waste in a storage barrel, comprising a plurality of shielding containers each having massive concrete walls in a substantially square cross section surrounding the storage barrel, each shielding container having two pairs of oppositely-disposed sections, one of said pairs having symmetrical projections formed thereon with a given shape extended outward from said substantially square cross section and the other of said pairs having recesses with said given shape formed therein extended into said substantially square cross section, each of said projections being releasably anchored in a respective one of said recesses of an adjacent shielding container when stacking said shielding containers in a horizontal row.

2. Shielding container assembly according to claim 1, wherein said projections and chamfers are disposed at corners of said shielding container.

3. Shielding container assembly according to claim 2, wherein said projections and chamfers are in the form of symmetrical pairs.

4. Shielding container assembly according to claim 1, wherein said shielding container has a clearance space formed therein for receiving said storage barrel, said space extending through the total height of said shielding container.

5. Shielding container assembly according to claim 4, wherein said clearance space has a cylindrical cross section and is centrally disposed in said substantially square cross section of said sheilding container.

6. Shielding container assembly according to claim 1, wherein said shielding container has top and bottom surfaces thereon, said surfaces having raised portions formed thereon and having recesses formed therein in which said raised portions fit.

7. Shielding container assembly according to claim 6, wherein said raised portions are disposed at four corners of said square cross section of said shielding container.

8. Shielding container assembly according to claim 6 or 7, wherein said shielding container has undercuts formed therein at said recesses for attachment of gripper tools.

9. Shielding container assembly according to claim 8, including reinforcements being disposed in said undercuts and extended into said shielding container.

10. Shielding container assembly according to claim 1, including a storage chamber having straight walls with recesses formed therein, said projections being extended into said recesses.

11. Shielding container assembly for storing weak to medially active waste in a storage barrel, comprising a plurality of shielding containers each having massive cast iron walls in a substantially square cross section surrounding the storage barrel, each shielding container having two pairs of oppositely-disposed sections, one of said pairs having symmetrical projections formed thereon with a given shape extended outward from said substantially square cross section and the other of said pairs having recesses with said given shape formed therein extended into said substantially square cross section, each of said projections being releasably anchored in a respective one of said recesses of an adjacent shielding container when stacking said shielding containers in a horizontal row.

* * * * *